Sept. 15, 1942.   L. G. COPEMAN   2,295,891
BIRD HOUSE CONSTRUCTION
Filed Aug. 3, 1940    2 Sheets-Sheet 1
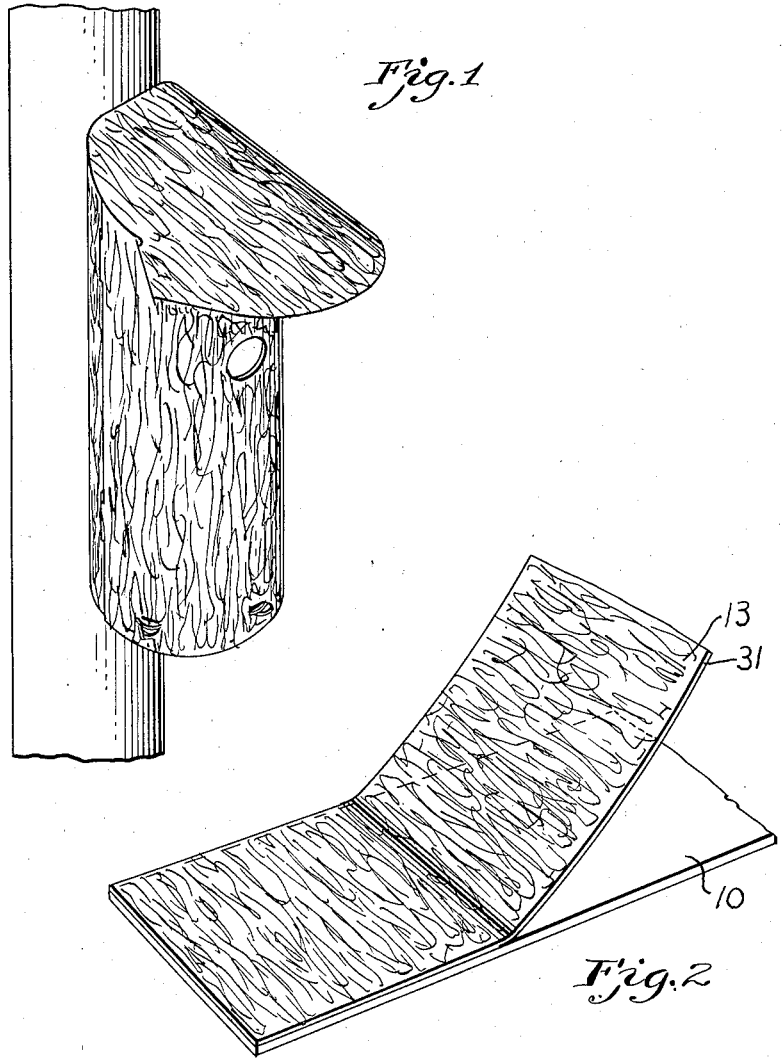
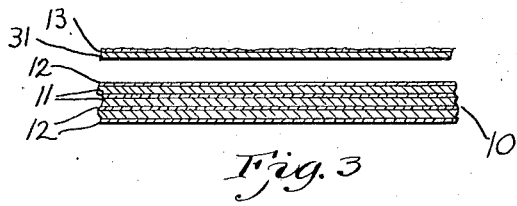
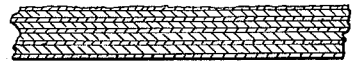
INVENTOR.
Lloyd C. Copeman
BY
Barnes, Kisselle, Laughlin & Raisch
ATTORNEYS Sept. 15, 1942.                    L. G. COPEMAN                    2,295,891
                                BIRD HOUSE CONSTRUCTION
                    Filed Aug. 3, 1940              2 Sheets-Sheet 2
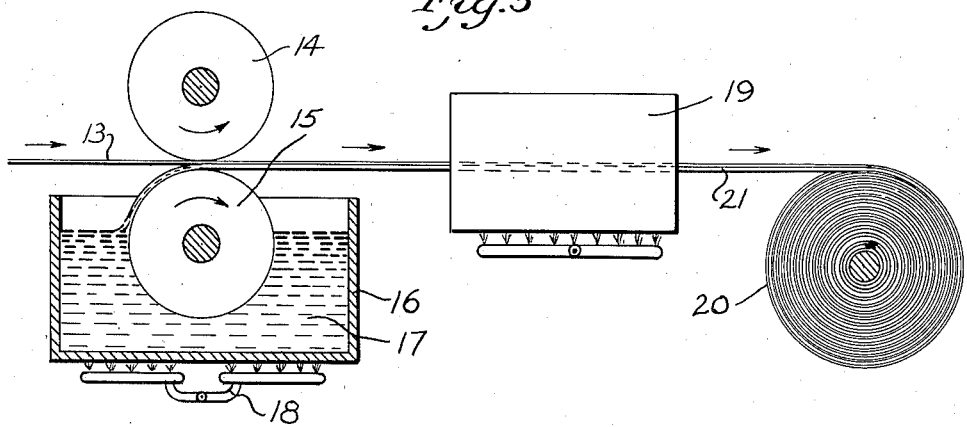
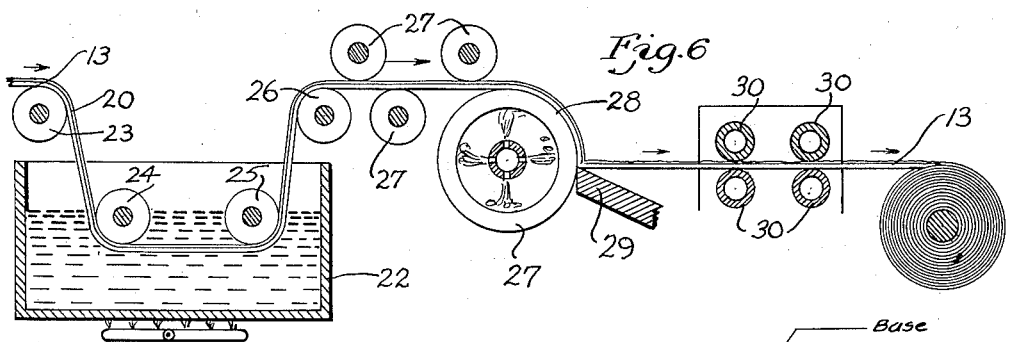
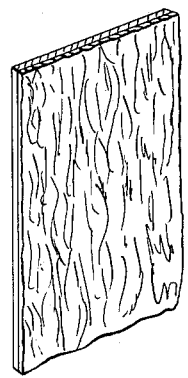
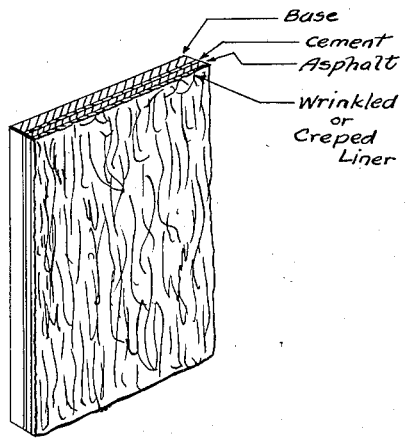
INVENTOR.
Lloyd G. Copeman
BY Barnes, Kisselle, Laughlin & Raisch
ATTORNEYS Patented Sept. 15, 1942

2,295,891

UNITED STATES PATENT OFFICE 2,295,891

BIRD HOUSE CONSTRUCTION

Lloyd G. Copeman, Flint, Mich.

Application August 3, 1940, Serial No. 350,343

5 Claims. (Cl. 41—24)

This invention relates to bird house construction.

In bird house construction it is desirable in some cases to use material which simulates the natural habitats usually used by birds. In the making of paper bird houses, a problem which has arisen is that of forming the paper in such a manner that it will simulate the bark of a tree especially when the bird houses are to be used for nuthatches or flickers or birds of similar families.

It is an object of the present invention to provide a method of forming a weatherproof paper which is similar in appearance to the bark of a tree and which is so formed that birds of the above families may cling thereto. A further object of the invention has to do with providing a weatherproof paper with a bark-like surface which is of such a nature that it may be used to form bird houses and other similar structures.

Other features and objects of the invention having to do specifically with steps in the method will be set forth in more detail in the following description and claims.

In the drawings:

Fig. 1 is a perspective view of a bird house which has been formed from the paper which simulates bark.

Fig. 2 is an illustration of the paper as it is being adhered to a backing.

Figs. 3 and 4 are highly magnified cross sections of the paper illustrating the manner of formation.

Figs. 5 and 6 illustrate apparatus for carrying out the steps in the method.

Figs. 7 and 8 are enlarged views of the paper showing the various laminations.

The base material of the bark paper consists of laminations of kraft paper covered with asphalt, these laminations being built up to any desired thickness. This is an old product and well known to those skilled in the paper art. In Figs. 2 and 3, this base material is indicated generally at 10, the paper laminations being shown at 11 and the asphalt being shown at 12. As previously stated, the cross sections shown in Figs. 3 and 4 are highly magnified for purposes of illustration. The kraft paper, to form the base 10, is passed between rolls which are run in heated liquid asphalt. Both sides of the paper, which are thus coated with asphalt, act as a binder between the laminations. The base is to be covered with creped or bark-like paper which is formed as follows:

A single sheet 13 of the kraft paper is passed between two rollers 14 and 15 shown in Fig. 5. The lower roller 15 runs in a tank 16 of heated asphalt 17. A burner for heating the asphalt is shown at 18. The saturation of the paper by this asphalt is sufficient to render the same non-absorbent. The paper passes from these asphalt rollers 14 and 15 through a dryer 19 and is rewound into another roll 20 after the coating of asphalt is dried. The asphalt is shown at 21 in exaggerated proportions in Fig. 5. The roll of paper 20 is then taken to a creping machine and the sheet is passed with the uncoated side down through a bath of warm water, about 125° to 175° F., which is contained in a tank 22 heated by a gas burner. Rollers 23, 24, 25 and 26 serve to convey the paper through the tank as shown. From the rollers 26 the paper is then passed over a heated roller 27. The paper is stretched over the rollers as it passes through the hot water bath. This stretching is accomplished by rotating rollers 26 at a faster rate than the rollers 23, 24 and 25. Due to the wet condition of the paper and the adherence to the rollers this stretching is easily accomplished. Because of this stretching and heating, the paper will stick to the roller 27 as shown, for example, at 28. From roller 27 this paper is separated by a knife 29 which presses against the surface of the roller. The water bath has a tendency to contract the paper and as soon as it is scraped off roller 27, it immediately contracts to form the crepe or wrinkles. From that point it is passed over several heated rollers 30 to effect drying and it is then rewound into bundles.

The amount of take-up or the extent of wrinkling is apparently due to the tension or stretch which is placed on the paper between the time it passes through the warm water bath 22 and the time it leaves roller 27. The greater the tension over the rollers 26 and 27, the greater the wrinkling and the larger the wrinkles are. It is possible to crepe the paper as much as 60 per cent. After this creping step, the crepe paper 13 is coated on the underside with an adhesive 31 and the bark-like paper is adhered to the backing 10, see Figs. 2 and 3. The adhesive 31 is preferably a waterproof one such as liquid latex which is an aqueous dispersion of rubber. There is enough asphalt in this surface paper to make it impervious to water and, consequently, the whole sheet becomes a waterproof product which simulates, in appearance and color, the bark of a tree. The paper is also flexible enough so that it may be formed or folded into the designs which are desired, see Fig. 1.

The paper material above disclosed is particularly useful within paper bird houses which are designed particularly for the Flicker family and those birds which build deep nests. The inside bark paper permits the small birds to climb up to the bird house opening whereas on a smooth paper surface, they would be helpless. This inside bark surface could be provided over the entire inside of the house or simply adjacent the opening and leading down into the nest portion.

What I claim is:

1. A method of producing a weatherproof bark-like material to be used in bird house construction which comprises coating a sheet of paper to render the same impervious to water, drying the paper, heating said paper in a liquid bath, stretching said paper while heating the same and releasing said paper to permit self-contraction thereof to form a bark-like surface thereon, and placing the same on backing material with the use of an adhesive.

2. A method of producing a weatherproof bark-like material to be used in bird house construction which comprises coating a sheet of paper on one side with a liquid waterproofing material, drying said paper, heating said coated paper by passing the same through a bath of heated liquid and over one or more heated rollers, and removing said paper from said roller to permit self-contraction of the same, drying said resulting creped paper, and placing said paper on a suitable backing material with the use of an adhesive substance.

3. A method of producing a weatherproof bark-like material to be used in bird house construction which comprises coating a sheet of paper on one side with liquid asphalt to render the same impervious to water, drying the paper, heating said paper in a liquid bath, stretching said paper while heating the same and releasing said paper to permit contraction thereof to form a bark-like surface thereon, and placing the same on a backing material with the use of an adhesive.

4. A method of producing a weatherproof bark-like material to be used in bird house construction which comprises coating a continuous sheet of paper on one side with liquid asphalt to render the same impervious to water, drying the paper, heating said paper in a bath of warm water, stretching said paper while heating the same and releasing said paper to permit contraction thereof to form a creped bark-like surface thereon, and backing said paper with a waterproof backing material by the use of an adhesive formed of an aqueous solution of rubber.

5. A method of producing a weatherproof bark-like material to be used in bird house construction which comprises saturating a sheet of paper with asphalt, drying the paper, passing said paper through a bath of warm water, and subsequently heating the same while placing it under tension, releasing the tension to permit contraction of said paper to form a creped, bark-like surface thereon, and mounting said paper on a waterproof backing material by the use of a liquid rubber adhesive.

LLOYD G. COPEMAN.